| United States Patent [19] | [11] | 4,218,351 |
|---|---|---|
| Rasmussen | [45] | Aug. 19, 1980 |

[54] IMPACT RESISTANT, THERMOPLASTIC POLYAMIDES

[75] Inventor: Jerald K. Rasmussen, Stillwater, Minn.

[73] Assignee: Minnesota Mining and Manufacturing Company, St. Paul, Minn.

[21] Appl. No.: 924,856

[22] Filed: Jul. 17, 1978

[51] Int. Cl.² .................... C08G 69/26; C08L 91/00; C09J 3/16
[52] U.S. Cl. ................. 260/18 N; 260/404.5
[58] Field of Search ................. 260/18 N, 404.5 PA

[56] References Cited

U.S. PATENT DOCUMENTS

| 3,549,573 | 12/1970 | Gabris | 260/18 N |
|---|---|---|---|
| 3,776,865 | 12/1973 | Glaser et al. | 260/404.5 PA |
| 4,018,731 | 4/1977 | Sims | 260/23.7 N |
| 4,045,389 | 8/1977 | Drawert et al. | 260/404.5 PA |
| 4,062,820 | 12/1977 | Mitchell et al. | 260/18 N |
| 4,072,641 | 2/1978 | Loeb | 260/404.5 PA |

FOREIGN PATENT DOCUMENTS 1319807  6/1973  United Kingdom .................. 260/18 N

*Primary Examiner*—Ronald W. Griffin
*Attorney, Agent, or Firm*—Cruzan Alexander; Donald M. Sell; Mark A. Litman

[57] ABSTRACT

Impact resistant, thermoplastic polyamides having 57.5 to 94.75 mole percent short chain polyamide forming moieties, 5 to 30 mole percent polyamide-forming dimer acid moieties; and 0.25 to 12.5 mole percent polyamide-forming oligomer moieties are disclosed. The novel polyamides are especially well suited for use as hot melt adhesives.

14 Claims, No Drawings

IMPACT RESISTANT, THERMOPLASTIC POLYAMIDES

BACKGROUND OF THE INVENTION

This invention relates to polyamides having a particularly advantageous combination of chemical and physical properties. More particularly, this invention relates to polyamides which are particularly suited for use as hot melt adhesives.

Film-forming or fiber-forming polyamide resins such as nylon have been the subject of extensive research since the 1930's. Much of this research has been directed toward improving the mechanical and rheological properties, and processability of polyamide resins. Recent research has involved the evaluation of the physical properties of polyamides resulting from the copolymerization with other polyamide forming species of newly developed dimeric, long chain, dibasic fatty acids (commonly referred to as 'dimer acids') or dimer diamines which are dimer acids which have been converted to amines. Generally the direction of the aforementioned polyamide research has been to polymerize substantial amounts of dimer acids (or their amine derivatives) with other polyamide-forming species to improve the mechanical and rheological properties and the processability of the resulting polyamides. For example, U.S. Pat. No. 4,062,820, British Pat. No. 1,319,807, and U.S. Pat. No. 3,549,573 disclose the condensation polymerization of 31 to 51 mole percent (based upon total moles present) of a dimer acid with the remainder of the resulting polyamide comprised of conventional short chain dibasic organic acids and short chain organic diamines (hereafter "short chain polyamide-forming species") and various other species which improve the properties of the polyamides. The polyamides of the previously mentioned patents exhibit undesirable impact resistance or would not be suitable for use as hot melt adhesives due to excessive melt viscosities.

A patent which described polyamides having a limited amount of dimer acids (the remainder comprised of short chain polyamide-forming and other property improving species) is U.S. Pat. No. 4,018,731. Such polyamides which have been modified with very small amounts of dimer acid (e.g., 0.5 mole percent), when prepared as low melt viscosity resins, are excessively crystaline and brittle, exhibiting low impact strength.

The present invention provides polyamides with unexpectedly advantageous properties (particularly impact strength) by polymerization of intermediate amounts of dimer acids or dimer diamines (collectively designated hereafter as polyamide-forming dimer acids) with long chain polyamide-forming oligomers, prepolymers, or other polyamide-forming polymers and with mixtures of conventional short chain polyamide-forming species. The condensation polymerization of materials chosen from the above three classes produces polyamides which exhibit useful adhesive properties, are tough, flexible, and impact resistant and are advantageously suited for use as hot melt adhesives. The present polyamides also exhibit little or no phase separation at room temperature or elevated temperatures. Additionally, the softening point of the present polyamides is controllable by the choice of the short chain polyamide-forming components.

More particularly, the present invention provides, in one aspect, a copolyamide having a melt viscosity of less than 100 poise at 232° C., an impact resistance of at least 180 kg-m/square meter at −180° C. and at least 890 kg-m/square meter at 21° C. and a ball and ring softening temperature of at least 110° C., comprising the condensation product of a. 57.5 to 94.75 mole percent short chain polyamide-forming species or moieties;
b. 5 to 30 mole percent polyamide-forming dimer acid species or moieties;
c. 0.25 to 12.5 mole percent amorphous polyamide-forming oligomer, pre-polymer, or polyamide-forming polymer species or moieties having a number average molecular weight in the range of about 600 to 10,000, preferably 900 to 5,000.

In another aspect, the present invention provides a hot melt adhesive with particularly desirable properties.

It should be noted that all three of the generic classes of compounds which comprise the present polyamides are "polyamide-forming". "Polyamide-forming" herein means materials or compounds having functionality directly or indirectly capable of entering into a reaction which produces a polyamide, i.e. a polymer characterized as having within the structure at least some polyamide functionality of the formula,

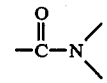

the functionality being connected with any of the various linking segments which may be used to connect the above described polyamide functionality. This definition is specifically meant to include species which form a polyamide while undergoing such reactions as ring opening, e.g., cyclic lactams; desterification, e.g., carboxylic acid esters; dehydration, e.g., amino acids, and dehalogenation, e.g., organic acid chlorides. Other such polyamide progenitors will be obvious to one skilled in the art.

The polyamide resins of the present invention may be prepared in a single step polymerization or cocondensation of a mixture having essentially equimolar or stoichiometric amounts of organic carboxylic acid functionality and organic amine functionality distributed among the three generic classes or constituent class (a, b, or c above) of compounds from which the instant polyamides derive. It has been found that only the combination of the polyamide-forming short chain component, the polyamide-forming dimer acid component, and the polyamide-forming long-chain oligomer or amorphous component in the mole percent ranges indicated produces the advantageous properties of the present polyamides as hereinafter more particularly described.

DETAILED DESCRIPTION OF THE INVENTION

The short chain organic acid or organic amine components of the present invention (the polyamide-forming short chain component) generally comprise organic dicarboxylic acids or organic diamines, the amine functionalities of the diamine being independently primary or secondary. The short chain polyamideforming component also includes difunctional species which have acid and amine functionality in a single momomer such as found in amino acids or lactams. In producing the present polyamides, a single diacid may be reacted with an appropriate stoichiometric amount of a single diamine or a mixture of diamines. Alternatively a mixture of diacids may be reacted with a single diamine or a mixture of diamines. To obtain the desired properties the short chain polyamide-forming component of the present invention is generally present in the range of about 57.5 to about 94.75 mole percent based upon total moles present with the preferred range being about 65 to about 91.5 mole percent.

The short chain dicarboxylic acids which may comprise part of the short chain polyamide forming component of the present invention have the general formula:

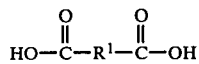

and when incorporated in the polyamide,

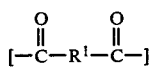

$R^1$ being an aliphatic, cycloaliphatic or aromatic hydrocarbon radical having from 2 to about 15 carbon atoms. Examples of short chain dicarboxylic acids which have utility in the present invention include succinic acid, glutaric acid, adipic acid, trimethyladipic acid, pimelic acid, suberic acid, azelaic acid, sebacic acid, isomers of cyclohexanedicarboxylic acid, phthalic acid, isophthalic acid, terephthalic acid, naphthalic acid (e.g. 1,4- and 2,6-naphthalene dicarboxylic acid), diphenic acid, and anthracene dicarboxylic acid. $R^1$ also may contain heteroatoms, as in diglycolic acid, thiodipropionic acid, oxydibenzoic acid, 4,4'-sulfonyldibenzoic acid, and 2,2'-benzophenone dicarboxylic acid. Carboxylic acid derivatives or progenitors, e.g., acid chlorides, esters and acid anhydrides, also have utility in the present invention and as noted above, are included within the definition of polyamide-forming species. The preferred short chain dicarboxylic acid monomers of this invention are adipic acid, azelaic acid and sebacic acid.

The short chain diamines useful in the present inventions have the general formula

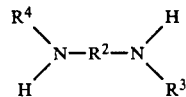

and when incorporaed into the present polyamides

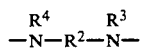

$R^2$ being a short-chain hydrocarbon radical having from 2 to 15 carbon atoms, and $R^3$ and $R^4$ are independently H or lower alkyl having from 1 to 4 carbon atoms or $R^3$ and $R^4$ together form an alkylene group of 2 to 8 carbon atoms and are part of a heterocyclic ring incorporating the structure

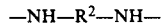

Aliphatic, cycloaliphatic or aromatic short chain diamines are included in the above formula. Examples of suitable short-chain diamines include ethylenediamine, 1,6-diaminohexane, 1,8-diaminooctane, 1,12-dodecanediamine, methylenebiscyclohexylamine, m- and p-xylylenediamine, bis(aminomethyl)cyclohexane, piperazine, 2-methylpiperazine, 2,5-dimethylpiperazine, 4,4'-trimethylenedipiperidine, isophoronediamine, diaminocyclohexane, bis(aminoethyl)benzene, methylenedianiline, phenylenediamine, diaminonaphthalene, and toluenediamine. Heteroatom-containing diamines also may be used, such as N-(2-aminoethyl)piperazine, N,N'-bis(3-aminopropyl)piperazine, diethylenetriamine, 3,3'-diamino-N-methyldipropylamine, 3,3'-diaminodipropylether, 2,2'-diaminodiethylether, 4,4'-oxybis-(aminomethyl)benzene, 2,5-bis(aminomethyl)thiophene, oxydianiline and the like. Optionally, alkanolamines such as ethanolamine, may be substituted for part of the diamine component of the present polyamides. Due to their ability to adhere to a wide variety of substrates, preferred short-chain diamine monomers are piperazine, dipiperidyl monomers and alkylenediamines having from 2 to 6 carbon atoms.

Aminoacids and lactam moieties are useful in the present invention and may be included in the short chain acid or amine component. Such monomers have the requisite amine-acid functionality in the same monomer in a free or latent form such as in cyclic lactams, and when incorporated into the present polyamides have the structure

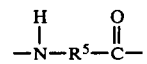

wherein $R^5$ is defined the same as $R^2$ above. Representative amino acids include 4-aminobutyric acid, 5-aminocaproic acid, and 11-aminoundecanoic acid. Representative lactams are 2-pyrrolidone, 2-piperidone, δ- and ε-caprolactam, enantholactam, capryllactam, undecanolactam, laurylactam, and alkyl substituted caprolactams. Preferred are ε-caprolactam, 11-aminoundecanoic acid or its lactam, and 12-aminododecanoic acid or its lactam.

The polyamide-forming dimer acids (which as defined above includes carboxy functional dimer acids and derivatives thereof, e.g., amine derivatives) of the present invention are prepared by the thermal polymerization (with or without catalyst) of saturated, ethylenically unsaturated, or acetylenically unsaturated monocarboxylic acids containing 8–24 carbon atoms with monocarboxylic acids having 16–20 carbon atoms being preferred. Dimer acids are, for the most part, a variety of substituted cyclohexenedicarboxylic acids formed by a Diels-Alder type reaction. Their structure can be simplistically represented as

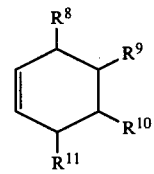

wherein $R^8$, $R^9$, $R^{10}$ and $R^{11}$ are saturated or unsaturated hydrocarbon residues, any two of which contain the functionality required for polyamidification. Examples of possible $R^8$-$R^{11}$ groups include —$(CH_2)_8COOH$; —$CH$=$CH(CH_2)_8COOH$; —$CH_2CH$=$CH$—$(CH_2)$-

$_7$COOH; —(CH$_2$)$_8$—NH$_2$—CH=CH—(CH$_2$)$_8$NH$_2$; CH$_3$(CH$_2$)$_4$; CH$_3$(CH$_2$)$_4$CH=CH—; —COOH, —CH$_2$NH$_2$, etc. Structures other than the above, however, are known to be present in the polymerized fat acid mixture. Such polyamide-forming dimer acids are present in the range of about 5 to 30 mole percent based upon total moles present with about 7.5 to about 25 mole percent being preferred when incorporated into the present polyamides. The dimer acids have the structure when incorporated into the present polyamides

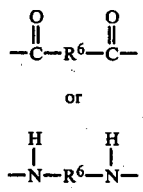

wherein R$^6$ is a dimerized polymeric fat acid residue. In the commercial preparation of polymer fat acids, synthetic or naturally derived C$_{18}$ monocarboxylic acids are generally polymerized.

Preferred polyamide-forming dimeric fat acids for use in the present invention are generally comprised of at least 80% by weight dimeric fat acids, the remainder comprising monomeric starting materials, structurally altered monomers, trimeric and higher polymeric polyamide-forming polymer fat acids.

Polymeric fat acids may be converted to their respective amine derivatives, e.g., by reaction of the carboxylic acid functionality with ammonia to form a nitrile with subsequent reduction of the nitrile to a primary amine, prior to being incorporated into the polyamides of the present invention. Thus, for the purposes of the invention, the polymeric fat acid polyamideforming moiety can be acid functional (which includes acid derivatives, e.g., acid chlorides, esters and anhydrides) or amine functional. The C$_{21}$ cycloaliphatic dicarboxylic acid Diels-Alder reaction product of linoleic acid and acrylic acid as described in U.S. Pat. No. 3,753,963 is a specifically contemplated polymeric fat acid which may be used in the present invention. Hydrogenated forms of such dimer acids, in which a substantial portion of the unsaturation has been removed, are also useful for the purposes of the invention. A particularly useful discussion of the type of polymer fat acids employed herein is contained in "The Dimer Acids" E. Leonard, editor, published by the Humko Sheffield Chemical Company in Connecticut.

The molecular composition of the long chain polyamideforming oligomers or prepolymers (which contribute amorphous, long chain segments to the polyamide and are hereafter referred to as the 'amorphous component' or amorphous materials) of the present composition may include species as chemically different as polyethers and polyolefins. The presence of functionality (usually difunctionality) capable of reacting to produce a polyamide is required of the amorphous component as is a molecular weight falling in the range of about 600 to about 10,000 with molecular weights in the range of about 900 to 5,000 being preferred. The long chain polyamide-forming amorphous component is present in the range of about 0.25 to 12.5 mole percent based upon total moles present with about 1.0 to about 10 mole percent being preferred. When incorporated into the present polyamides the long chain carboxy or amine functional amorphous component has the structure

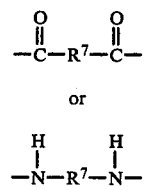

wherein R$^7$ is a linear or branched hydrocarbon or polyether chain optionally bearing various substituents and having a number average molecular weight in the range of about 600 to about 10,000 with a molecular weight of about 900 to about 5,000 being preferred. A variety of suitable amorphous materials as commercially available, such materials being commonly used as epoxy resin curing agents, flexibilizing agents or urethane monomer or prepolymer systems. Examples of useful, amide-forming amorphous materials include amine or carboxy terminated olefin polymers, e.g., the butadiene-acrylonitrile copolymers commercially available from the B. F. Goodrich Company under the trade designations "HYCAR ATBN" and "HYCAR CTBN" respectively; and carboxy terminated polybutadienes commercially available from the B. F. Goodrich Company under the trade designation "HYCAR CTB". Particularly good results have been obtained using functionalized polyethers such as poly(oxyalkylene)-diamines and dicarboxylic acids. These polyoxyalkylenes can be represented by the general structural formula

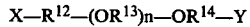

where X and Y are amine or carboxyl functionalities, and R$^{12}$, R$^{13}$ and R$^{14}$ are linear or branched hydrocarbon chains and n has a value of about 5 to 225. Representative poly(oxyalkylenes) include polypropyleneoxide and polyethyleneoxide based diamines, amine or carboxy terminated poly)tetramethyleneoxide) (R$^{12}$, R$^{13}$, R$^{14}$=(CH$_2$)$_4$) and carboxy terminated polyethyleneoxides. The poly(oxyalkylene) diamine materials are commercially available from the Jefferson Chemical Company under trade designations such as "Jeffamine D"

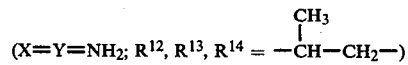

and "Jeffamine ED"

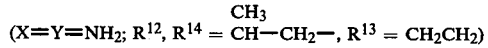

and derivatives thereof.

The polyamides of the present invention are prepared by reacting the acid functionalities with the amine functionalities using techniques which are well known to one skilled in the art. Normally, the polymerization or condensation reaction is carried out at temperatures in the range of about 100° C. to 300° C. at reduced pressure. All of the components of the present polyamides are simultaneously charged to a temperature controlled reactor having stirring means, and a means for controlling the pressure and gaseous composition of the gases admitted to the reactor. At the beginning of the reaction, the reactor is generally heated to a temperature in the range of about 150° C. to about 265° C. Condensation of the amine and acid components begins, generating water vapor which may be condensed out of the reaction mixture. After approximately 80% of the theoretical yield of water has been removed, the temperature of the reaction mixture is raised to at least about 200° C., preferably above 220° C. to about 300° C. Any remaining water may be conveniently removed by reducing the pressure over the reaction mixture. The actual temperature employed in either heating stage is largely determined by the melting point of the salt of the short chain diacid and diamine or by the softening point of the crystalline segment of the resulting polyamide. For example, a polyamide of polymeric fat acid, piperazine, adipic acid and the amorphous component may be prepared in one step by heating a mixture of these components at 265° C. (piperazine adipate melts at 256°–257° C.).

Substantially equivalent amounts of acid and amine functionality are generally employed in the reaction mixture, although a slight excess of either component may be employed. Optionally, small amounts of monobasic carboxylic acid or monoamine materials may be employed as a chain terminating agent, thus controlling the molecular weight of the resultant polyamide. It is generally preferable to add an antioxidant, such as a hindered phenol derivaive, to protect the polyamide from oxidation.

The polyamides of the present invention are advantageously suited for use as hot melt adhesives. The adhesives may be melted by conventional means at temperatures in excess of 200° F. (93° C.). As mentioned above, the molecular weight of the polyamide may be controlled by the inclusion of small amounts of monobasic acid or amine components. By controlling the molecular weight of the polyamide, the melt viscosity of the polyamide may also be controlled. Normally the ball and ring softening temperatures of the present polyamides are greater than about 230° F. (110° C.) and less than about 450° F. (232° C.). While polyamides having softening temperatures of less than 230° F. (110° C.) may be synthesized, the lower heat resistance of such polyamides limits their utility to applications having minimal temperature requirements.

The melt viscosities of the present polyamides at 450° F. (232° C.) are generally less than 100 poise, and preferably less than about 50 poise. This range of melt viscosity is particularly advantageous because it falls well within the range of viscosities which may be handled by the simplest types of equipment, e.g. hand-held applicator guns. As noted above, the present polyamides may be polymerized to a hgher molecular weight by the use of approximately stoichiometric amounts of difunctional acids and difunctional amines. Higher molecular weight polyamides, as expected, would have higher melt viscosities which would tend to limit their utility to the more sophisticated application techniques. Where stoichiometric amounts of difunctional acid and difunctional amines are employed, the reaction time period must be closely monitored and polyamide periodically tested in order to obtain a product having the requisite melt viscosity.

The polyamides of the present invention may be blended with plasticizers, tackifiers, pigments, dyes, modifiers and other materials known to the art to obtain polymers having modified performance characteristics. Similarly, finely divided fillers such as clay, colloidal silica, or titanium dioxide may be added to the polyamides, e.g., to control their rheological and other physical properties.

As noted above, the present polyamides may be employed as hot-melt adhesives using conventional hot-melt adhesive application equipment. Similar or dissimilar substrates may be aggressively bonded to each other by applying a molten layer of the present polyamides to one or both of the surfaces to be bonded. The adhesive coated surfaces are then placed in contact with one another, and optionally, pressure may be applied with the adhesive is permitted to cool, thus forming the polyamide bond. Alternatively, the present adhesives may be formed into heat activatable, self-supporting films. Such films may be used in sheet form or, when wound upon themselves, in tape form. When a film or sheet of the present adhesives is employed, the adhesive film or sheet is placed between the substrates to be bonded and the entire assembly is heated to the softening temperature of the adhesive (optionally, pressure may be applied). When the substrates and adhesive cool, an aggressively bonded composite or laminate results.

The present adhesives may be reinforced by coating onto a flexible backing such as a polyethylene terephthalate film. The polyamides may be cast onto a suitable backing from a melt or solvent casting techniques may be utilized. Useful solvents for the polyamides of this invention generally include chlorinated hydrocarbons and lower alcohols. Preferred solvents are methanol, ethanol, n-propanol, isopropanol and mixtures of these alcohols with aromatic solvents such as toluene and xylene.

The practice of the present invention is illustrated by means of a number of examples which should not be interpreted to limit the scope thereof. Unless otherwise indicated all percentages are mole percent based upon the total moles present. Several tests have been employed to evaluate the performance characteristics of the present polyamides. These tests include the following:

Ball and Ring Softening Point:

This test, as described in ASTM Test Designation E28-67T, generally consists of filling a ring with a molten sample of the resin to be tested, allowing the resin to cool in the ring, suspending the ring in a horizontal position in an inert liquid, placing a ball on top of the resin, gradually heating the liquid, and noting the temperature at which the resin has sagged 1 inch (about 25 mm).

Melt Viscosity:

10.5 gram samples of the polyamide being tested are placed in the sample chamber of a Brookfield Rheolog viscometer commercially available from Brookfield Engineering Laboratories, Inc. The samples are heated to 450° F. (232° C.) at which temperature the melt viscosities were measured.

Impact Strength:

This test is described in detail in ASTM Test Designation D950-72. Generally, wooden specimens, e.g., polished maple, 1 in. (2.5 cm)×1 in. (2.5 cm)×⅜ in. (0.95 cm) and 1" (2.5 cm)×1¾41 (4.4 cm)×¾ in. (1.9 cm) are bonded face to face with molten adhesive, allowed to cool, then aged at 70° F. (21° C.) and 50% relative humidity for 24 hours. The aged samples then are tested using a pendulum-type impact apparatus described in the above ASTM test. The energy required to shear the bond by a single blow of the pendulum is then determined. For the 0° F. (−18° C.) impact tests, samples are aged an additional 4 hours at 0° F. (−18° C.) prior to testing. For impacts at 0° C.) a 3-pound (1.4 kg) hammer is used, and at 70° F. (21° C.) a 4-pound (1.8 kg) hammer is used. It should be noted that many of the impact strength measurements are followed by a "+". The "+" indicates that the maximum impact of the tester [i.e. 63 in-lb/in$^2$ (1,130 kg-m/m$^2$) at 0° F. (−18° C.) and 84 in-lb/in$^2$ (1,500 kg-m/m$^2$) at 70° F. (21° C.)] has been applied to the sample and that the sample has absorbed the maximum impact without breaking.

EXAMPLE 1

A 500 ml glass 3-neck flask equipped with a stirrer, inert gas inlet, and a condenser fitted with a water trap was charged with 40.40 g (50 mole percent) sebacic acid, 12.04 g (35 mole percent) piperazine, 30.32 g (12.5 mole percent) "Kemamine 3680" (a dimer diamine comprised of 80% by weight 36 carbon atom dimer commercially available from Humko-Sheffield Chemical Co.) and 20.00 g (2.5 mole percent) "Jeffamine D-2000" (a polyoxypropylene diamine having a molecular weight of approximately 2,000), and 0.10 g (0.1% by weight), tetrakis [methylene-3-(3',5'-ditertbutyl-4'-hydroxyphenyl)propionate]-methane, a hindered phenol antioxidant commercially available from the Ciba-Geigy Corporation under the trade designation "Irganox 1010".

The flask and its contents were then placed in a bath previously heated to 160° C. and stirred (while being purged with nitrogen) until the reaction mixture reached the bath temperature as indicated by the melting of the monomers.

While continuing to purge and stir, the temperature of the reaction medium was raised from 160° C. to 220° C. over a period of 65 minutes, at which time about 5.5 ml water had been collected. Next the nitrogen purge was shut off and the condenser-water trap was replaced with a dry ice cooled receiver that was hooked into a vacuum line. The reaction vessel was evacuated to a pressure of about 1 Torr while the bath temperature was increased to 245° C. Polymerization was continued under these conditions (i.e., 1 Torr pressure, 245° C. with stirring) for an additional 20 minutes. The resultant polyamide was a clear gold to amber color in the melt. Upon cooling, the polyamide became opaque due to crystallization. The viscosity, ball and ring softening point, and impact strength of the polyamide are listed in Table 1.

EXAMPLES 2-11

A number of additional sebacic acid piperazine polyamides were made by a procedure similar to that used in Example 1 with the exception that varying mole percentages (based upon total charge) of "Kemamine 3680" and piperazine were employed. The results obtained are summarized in Table 1.

It is to be noted from Table 1 that all three of the polyamide constituent classes must be represented in the reactant mixture to obtain the desirable physical properties, especially impact strength, in the polyamide. Example 11 shows that the absence of the dimer diamine produces a low strength material. Replacement of the short-chain diamine with the polymeric fat acid dimer diamine (Ex. 2) produces a polyamide with only slightly improved (over Ex. 11) impact strength.

For these particular components, when the fat acid dimer diamine is present in the range of about 7.5 mole percent to 12.5 mole percent (Ex. 1 and 8 and Ex. 9) both the 0° F. (−18° C.) and 70° F. (21° C.) room temperature impact strengths are dramatically improved. If room temperature impact strength is the primary concern, improvement is seen when the fat acid dimer diamine is present in the range of about 7.5 mole percent to 42.5 mole percent (Ex. 3 to 9). Above about 20 mole percent, however, the softening point of the polyamide falls below 110° C. (Ex. 3 to 6).

The Examples of Table 1 also bring out another point concerning the polyamides of the present invention. It was found that when the fat acid dimer diamine is present at less than about 7.5 mole percent (Ex. 9, 10 and 11), the amorphous component ("Jeffamine D-2000") appears to be incompatible with the remaining polyamide-forming species in that a phase separation developes during polymerization. This inhomogeneity increases during the process of polyamide formation and undoubtedly contributes somewhat to the poor physical properties of the polymers. At higher dimer diamine levels, however, this phase separation disappears, indicating that the dimer acid derivative plays an important role in keeping all components compatible in the melt.

TABLE 1

| Ex. No. | Mole percent based upon total charge | | | | Viscosity poise at 450° F. (232° C.) | Ball and ring softening point | | Impact strength, in-lbs/in$^2$ (kg-m/m$^2$) | | | |
|---|---|---|---|---|---|---|---|---|---|---|---|
| | Sebacic acid | piperazine | "Kemamine 3680" | "Jeffamine D-2000" | | °F. | (°C.) | 0° F. | (−18° C.) | 70° F. | (21° C.) |
| 1 | 50 | 35 | 12.5 | 2.5 | 34 | 275 | (135) | 30 | (540) | 84+ | (1,500+) |
| 2 | 50 | 0 | 47.5 | 2.5 | 53 | 212 | (100) | 11 | (200) | 38 | (680) |
| 3 | 50 | 5.0 | 42.5 | 2.5 | 80 | 207 | (97) | 20 | (360) | 58 | (1,040) |
| 4 | 50 | 10 | 37.5 | 2.5 | 8 | 174 | (79) | 22 | (390) | 84+ | (1,500+) |
| 5 | 50 | 15 | 32.5 | 2.5 | 23 | 175 | (79) | 14 | (250) | 84+ | (1,500+) |
| 6 | 50 | 25 | 22.5 | 2.5 | 10 | 177 | (81) | 11 | (200) | 84+ | (1,500+) |
| 7 | 50 | 30 | 17.5 | 2.5 | 49 | 254 | (123) | 16 | (290) | 84+ | (1,500+) |
| 8 | 50 | 37.5 | 10 | 2.5 | 35 | 285 | (141) | 63+ | (1,130+) | 84+ | (1,500+) |
| 9 | 50 | 40 | 7.5 | 2.5 | 17 | 302 | (150) | 63 | (1,130) | 71 | (1,270) |
| 10 | 50 | 42.5 | 5.0 | 2.5 | 17 | 302 | (150) | 21 | (380) | 26 | (460) |
| 11 | 50 | 47.5 | 0 | 2.5 | 27 | 326 | (163) | 7 | (130) | 7 | (130) |

EXAMPLES 12-21

These examples illustrate the effect of varying the amount of the long chain amorphous component.

Examples 12 through 21 were run using a procedure similar to that of Example 1 with the exception that the mole percent of the dimeric fat acid diamine was held constant at 10% while the ratio of short chain diamine to amorphous, amine functional material was varied. The physical properties of the resulting polymers are contained in Table 2.

Table 2 also suggests that all three classes of compounds must be represented in the polymer to obtain the desirable properties in that omission of the long-chain amorphous component (Ex. 12) produced polyamides with poor impact resistance. Incorporation of as little as 0.25 mole percent of the long-chain amorphous component produced excellent room temperature impact resistance, while at least about 0.5 mole percent amorphous segment was necessary to provide desirable impact strength at 0° F. (−18° C.). Above about 10 mole percent amorphous component (Ex. 21) the polyamide became too soft and showed decreased impact strength at room temperature (21° C.).

primary amine functionality, incompatibility (e.g., a phase separation) developes during condensation and polymerization if the polyoxypropylene diamines are used. This is overcome by using the polyoxyethylene derivatives.

TABLE 3

| Ex. No. | Mole percent based on total charge | | | | Viscosity poise at 450° F. (232° C.) | Ball and Ring softening point | | Impact strength, in-lbs/in² (kg-m/m²) | | | |
|---|---|---|---|---|---|---|---|---|---|---|---|
| | 1,6 hexan-diamine | Azelaic acid | "Hystrene 3695" | "Jeffamine ED-900" | | °F. | (°C.) | 0° F. | (−18° C.) | 70° F. | (21° C.) |
| 22 | 45 | 0 | 50 | 5 | 9 | 183 | (84) | 18 | (320) | 17 | (300) |
| 23 | 45 | 5 | 45 | 5 | 18 | 190 | (83) | 46 | (820) | 78 | (1,400) |
| 24 | 45 | 25 | 25 | 5 | 8 | 328 | (164) | 60 | (1,070) | 82 | (1,470) |
| 25 | 45 | 35 | 15 | 5 | 17.5 | 357 | (181) | 61 | (1,090) | 79 | (1,410) |
| 26 | 45 | 40 | 10 | 5 | 17.5 | 385 | (196) | 16 | (290) | 15 | (270) |
| 27 | 45 | 45 | 5 | 5 | 40 | 402 | (206) | 26 | (460) | 22 | (390) |

TABLE 2

| Ex. No. | Mole percent based upon total charge | | | | Viscosity poise at 450° F. (232° C.) | Ball and ring softening point | | Impact strength, in-lbs/in² (kg-m/m²) | | | |
|---|---|---|---|---|---|---|---|---|---|---|---|
| | Sebacic acid | piperazine | "Kemamine 3680" | "Jeffamine D-2000" | | °F. | (°C.) | 0° F. | (−18° C.) | 70° F. | (21° C. |
| 12 | 50 | 40 | 10 | 0 | 8 | 288 | (142) | 18 | (320) | 20 | (360) |
| 13 | 50 | 39.75 | 10 | 0.25 | 48 | 296 | (147) | 18 | (320) | 84 | (1,500) |
| 14 | 50 | 39.5 | 10 | 0.5 | 92 | 299 | (148) | 30 | (540) | 84+ | (1,500+) |
| 15 | 50 | 39 | 10 | 1.0 | 61 | 296 | (147) | 46 | (820) | 84+ | (1,500+) |
| 16 | 50 | 37.5 | 10 | 2.5 | 35 | 285 | (141) | 63+ | (1,130+) | 84+ | (1,500+) |
| 17 | 50 | 36.25 | 10 | 3.75 | 24 | 280 | (138) | 63+ | (1,130+) | 84+ | (1,500+) |
| 18 | 50 | 35 | 10 | 5.0 | 17 | 276 | (136) | 58 | (1,040) | 84 | (1,500) |
| 19 | 50 | 32.5 | 10 | 7.5 | 14 | 268 | (131) | 63+ | (1,130+) | 84+ | (1,500+) |
| 20 | 50 | 30 | 10 | 10 | 20 | 257 | (125) | 63+ | (1,130+) | 84 | (1,500) |
| 21 | 50 | 27.5 | 10 | 12.5 | 20 | 201 | (94) | 35 | (630) | 27 | (480) |

EXAMPLE 22-27

These examples illustrate the flexibilization of 6.9 nylon.

Examples 22 through 27 show the effect on the physical properties of polyamides of the 6 carbon atom diamine, 1,6-hexanediamine, and the 9 carbon atom diacid, azelaic acid, and "Jeffamine ED-900" produced using varying amounts of the fat acid "Hystrene 3695" (a dimer diacid available from Humko-Sheffield Chemical Co., the dimer diacid comprising about 95% by weight of the mixture). The results of the evaluation are seen in Table III.

Consistant with earlier experience, the complete omission of one of the required chemical groups (the azelaic acid of Example 22) produced polyamides with relatively low impact resistance.

Also noteworthy is the fact that in the case of these particular monomers, a higher level of dimer acid derivative is required to provide the initial improvement in impact strength as compared with the sebacic acid-piperazine system (Ex. 25 & 26 vs. Ex. 9 & 10). Thus, the nature of the short chain polyamide-forming species will dictate the levels of the other two components necessary to produce desired properties.

Attention is also drawn to the fact that in this series of examples, "Jeffamine ED-900", a polyoxyethylene diamine, is used as the amorphous polyamide-forming species rather than the polyoxypropylene diamine, "Jeffamine D-2000", of the previous examples. We have found that when the diamine component contains a

EXAMPLE 28

A 500 ml 3 necked, glass, nitrogen purged reaction vessel equipped with a reflux condenser and stirrer was charged with 384.2 grams (74 mole percent) ε-caprolactam, 346.8 grams (13 mole percent) "Hystrene 3695", 34.4 grams (8.7 mole percent) piperazine, 400 grams (4.3 mole percent) "Jeffamine D-2000", and 1.2 grams (0.1 percent by weight) "Irganox 1010".

The reaction vessel and its contents were placed in a bath maintained at a temperature of 160° C. and, while stirring, warmed to the bath temperature (e.g., 10-15 min.). The reaction mixture next was refluxed at a bath temperature of 170° C. to 180° C. for 2.5 hours, the water generated in the condensation reaction being retained to catalyze the ring opening polymerization of ε-caprolactam. At this point reflux was discontinued and distillation begun, the temperature of the reactants being slowly raised to 230° C. The temperature of the reaction mixture was maintained at 230° C. until about 70% of the theoretical amount of water had been collected (about 2 hours). Lastly, the reaction vessel was slowly evacuated from atmospheric pressure (approx. 760 Torr) to about 20 Torr over the course of an hour so as to avoid foaming of the reactants.

After reaching the desired pressure of 20 Torr, the reaction mixture was maintained at this pressure for a short period, e.g., 30 minutes before it was permitted to cool. The properties of the resulting polyamide are listed in Table 4.

EXAMPLES 29-31

Modified caprolactam polymers were prepared using a procedure similar to the procedure of Example 28 the difference being that various component amounts and types were employed. The physical parameters of the resulting polyamides are listed in Table 4.

various types of prepolymers, oligomers or amorphous materials were employed. The properties of the result-

TABLE 4

| Ex. No. | Mole percent based on total charge | | | | | | | Viscosity poise at 450° F. (232° C.) | Ball and Ring softening point °F. (°C.) | Impact strength in-lb/in² (kg-m/m²) | |
|---|---|---|---|---|---|---|---|---|---|---|---|
| | capro-lactam | azelaic acid | adipic acid | "Hys-trene 3695" | piper-azine | "Kemamine DP-3680" | 2-am-ino-etha-nol | "Jeffa-mine D-2000" | | | 0° F. (−18° C.) | 70° F. (21° C.) |
| 28 | 74 | — | — | 13 | 8.7 | — | — | 4.3 | 9 | 348 (176) | 63+ (1,130+) | 84+ (1,500+) |
| 29 | 66.7 | — | 16.7 | — | — | 12.5 | — | 4.1 | 20 | 307 (153) | 63 (1,130) | 80 (1,430) |
| 30 | 74 | — | — | 13 | — | — | 8.7 | 4.3 | 34 | 348 (176) | 38 (680) | 83 (1,480) |
| 31 | 66.7 | 11.7 | — | 5 | 8.3 | — | — | 8.3 | 20 | 298 (148) | 63+ (1,130+) | 84+ (1,500+) | ing polyamides are listed in Table 6.

TABLE 6

| Ex. No. | Mole percent based upon total charge | | | | Viscosity poise at 450° F. (232° C.) | Ball and Ring softening point °F. (°C.) | Impact strength in-lb/in² (kg-m/m²) | |
|---|---|---|---|---|---|---|---|---|
| | sebacic acid | piperazine | "Kemamine DP-3680" | Long Chain | | | 0° F. (−18° C.) | 70° F. (21° C.) |
| 45 | 50 | 37.5 | 10 | 2.5ª | 25 | 280 (138) | 63+ (1,130+) | 84+ (1,500+) |
| 46 | 50 | 38.75 | 10 | 1.75ᵇ | 37 | 277 (136) | 63 (1,130) | 84+ (1,500+) |
| 47 | 50 | 38 | 10 | 2ᶜ | 350 | 291 (144) | 63 (1,130) | 84+ (1,500+) |

ªJeffamine ED-2001.
ᵇamine terminated acrylonitrile-butadiene copolymer, eq. wt. 1800, available from B. F. Goodrich [under the trade designation Hycar ATBN].
ᶜamine-terminated polytetramethyleneoxide, equivalent weight 1,350.

EXAMPLES 32–44

These examples illustrate the preparation of flexible, impact-resistant polyamides of the present invention from a variety of short-chain diacids and diamines. Examples 32–44 were run in a manner similar to the procedure of Example 1, the physical properties of the polyamides obtained being found in Table 5.

Of particular interest is the polyamide of Ex. 33 which was prepared from a 21 carbon atom fatty diacid available commercially from the Westvaco Chemical Division under the trade designation "Westvaco Diacid 1550".

EXAMPLES 48–57

These examples are included primarily for purposes of comparison.

Examples 48–50 illustrate that the use of long-chain amorphous prepolymers with molecular weights less than about 600 (e.g., 230 to 400) tend to produce polyamides with a poor balance of high temperature performance and impact resistance.

Examples 51–53 further illustrate the undesirable polyamides formed when one of the constituent classes is omitted.

TABLE 5

| Ex. No. | Mole percent based upon total charge | | | | | Viscosity poise at 450° F. (232° C.) | Ball and Ring softening point °F. (°C.) | Impact strength in-lb/in² (kg-m/m²) | |
|---|---|---|---|---|---|---|---|---|---|
| | Diacid | | Diamine | | | | | 0° F. (−18° C.) | 70° F. (21° C.) |
| | Short Chain | Fatty | Short Chain | Fatty | Long Chain | | | | |
| 32 | 50ª | — | 32.5ʰ | 10ᵍ | 7.5ʳ | 72 | 352 (178) | 63 (1,130) | 83 (1,480) |
| 33 | 35ª | 15ᵍ | 47.5ⁱ | — | 2.5ˢ | 10 | 274 (134) | 28 (500) | 84+ (1,500+) |
| 34 | 50ᵇ | — | 37.5ⁱ | 10ᵍ | 2.5ˢ | 39 | 260 (127) | 63+ (1,130+) | 84+ (1,500+) |
| 35 | 50ᵇ | — | 47.5ⁱ | — | 2.5ˢ | 55 | 295 (146) | 27 (480) | 26 (460) |
| 36 | 50ᵇ | — | 35ʲ | 10ᵍ | 5ʳ | 32 | 259 (126) | 63+ (1,130+) | 84+ (1,500+) |
| 37 | 50ᵇ | — | 27.5ᵏ | 12.5ᵍ | 10ʳ | 46 | 408 (209) | 17 (300) | 84+ (1,500+) |
| 38 | 50ᵇ | — | 30ˡ | 10ᵍ | 10ʳ | 10 | 284 (140) | 27 (480) | 84+ (1,500+) |
| 39 | 27.5ᵇ,10ᶜ | 12.5ᶠ | 47.5ⁱ | — | 2.5ˢ | 8 | 280 (138) | 51 (910) | 84+ (1,500+) |
| 40 | 50ᶜ | — | 35ᵐ | 10ᵍ | 5ʳ | 34 | 242 (117) | 63 (1,130) | 84+ (1,500+) |
| 41 | 25ᶜ | 25ᶠ | 40ⁿ | — | 10ʳ | 8.5 | 367 (186) | 63+ (1,130) | 84+ (1,500+) |
| 42 | 50ᶜ | — | 30ᵒ | 12.5ᵍ | 7.5ʳ | 8 | 266 (130) | 10 (180) | 84+ (1,500+) |
| 43 | 50ᵈ | — | 37.5ⁱ | 10ᵍ | 2.5ʳ | 12 | 275 (135) | 57 (1,020) | 84+ (1,500+) |
| 44 | 50ᵉ | — | 32.5ᵖ | 12.5ᵍ | 5ʳ | 48 | 252 (122) | 18 (320) | 84 (1,500) |

Diacid
a = sebacic acid
b = azelaic acid
c = adipic acid
d = pimelic acid
e = dimethyliso-phthalate
f = Hystrene 3695
g = Westvaco Diacid 1550

Diamine
h = 1,8-octanediamine
i = piperazine
j = N,N'-bis(3-amino-propyl)piperazine
k = methylenebiscyclo-hexylamine
l = m-xylylenediamine m = N-(2-aminoethyl)piperazine
n = 1,6-hexanediamine
o = 3,3'-diamino-N-methyldi-propylamine
p = 1,12-dodecanediamine
q = Kemamine DP-3680
r = Jeffamine ED-900
s = Jeffamine D-2000

EXAMPLES 45–47

Examples 45–47 were prepared according to a procedure similar to that of Ex. 1 with the exception that Examples 54–57 illustrate the properties of representative prior art polyamides having the noted compositions.

TABLE 7

| | Mole percent based upon total charge | | | | | | Viscosity poise at 450° F. (232° C.) | Ball and Ring softening point °F. (°C.) | Impact strength in-lb/in² (kg-m/m²) | |
|---|---|---|---|---|---|---|---|---|---|---|
| | Diacid | | | Diamine | | | | | | |
| Ex. No. | Short Chain | Fatty | Long Chain | Short Chain | Long Fatty | Chain | | | 0° F. (−18° C.) | 70° F. (21° C.) |
| 48 | 50$^a$ | — | — | 32.5$^g$ | 10$^j$ | 7.5$^k$ | 26 | 259 (126) | 18 (320) | 27 (480) |
| 49 | 50$^a$ | — | — | 20$^g$ | 10$^j$ | 20$^k$ | 18 | 172 (78) | 25 (450) | 84+ (1,500+) |
| 50 | 50$^a$ | — | — | 27.5$^g$ | 10$^j$ | 12.5$^l$ | 10 | 187 (86) | 27 (480) | 84+ (1,500+) |
| 51 | 50$^b$ | — | — | 47.5$^g$ | — | 2.5$^m$ | 55 | 295 (146) | 27 (480) | 26 (460) |
| 52 | 50$^b$ | — | — | 40$^h$ | 10$^j$ | — | — | — | 6 (107) | 10 (180) |
| 53 | 50$^a$ | — | — | 30$^g$ | 20$^j$ | — | 6 | 230 (110) | 14 (250) | 20 (360) |
| 54 | 12$^c$ | 38$^e$ | — | 45$^i$ | — | 5$^k$ | 50 | 386 (197) | 11 (200) | 15 (270) |
| 55 | 16.5$^b$ | 33.5$^e$ | — | 40$^j$ | — | 10$^l$ | 3 | 350 (177) | 11 (200) | 24 (430) |
| 56 | 15$^b$ | 35$^e$ | — | 47.5$^i$ | — | 2.5$^m$ | 6 | — | 7 (130) | 14 (250) |
| 57 | 98.7$^d$, 0.3$^b$ | — | 0.5$^f$ | — | 0.5$^j$ | — | 10 | — | * | * |

*Hardens too rapidly to enable bond making

Diacid
a = sebacic acid
b = azelaic acid
c = adipic acid
d = εcaprolactam
e = Hystrene 3695
f = B. F. Goodrich's CTBN (carboxy-terminated butadiene/acrylonitrile copolymer), eq. wt. = 1600

Diamine
g = piperazine
h = 1,6-hexane diamine
i = ethylene diamine
j = Kemamine DP-3680
k = Jeffamine D-230
l = Jeffamine D-400
m = Jeffamine D-2000

EXAMPLE 58

Illustrating a scale up run. A ten-gallon (38 liter) stainless steel reactor was charged, at ambient temperature and under N₂ purging, with 8,645 g (72.7 mole percent) ε-caprolactam, 7587 g (12.4 mole percent) "Hystrene 3695", equivalent weight 290) 774 g (8.6 mole percent) piperazine, 9000 g (4.2 mole percent) "Jeffamine D-2000" (equivalent weight 1034), 640 g (2.1 mole percent) stearic acid, and 26 g "Irganox 1010" (0.1% by weight). The reactor was sealed and the contents were heated with agitation to 250° C. over a 75-minute period. During this time the internal pressure on the reactor had risen to 10 psi due to vaporization of the water evolved in the polymerization. The contents of the reactor were maintained under these conditions (i.e., 250°–260° C., 10 psi, stirring) for an additional 35 minutes. The internal pressure was vented over 35 minutes back to atmospheric, collecting 480 ml distillate in the process. Vacuum was applied to the reaction medium lowering the pressure as rapidly as possible without excess foaming, reaching full vacuum (~30 torr) after 20 minutes. The reactor contents were maintained at ≦30 torr, 250°–260° C. for an additional 35 minutes. The final product was then collected, displaying the following properties: melt viscosity at 450° F. (232° C.) = 10 poise; ball and ring softening point 340° F. (171° C.); impact strength, 0° F. (−18° C.) 63 in. lb/in² (1,130 kg-m/m²), 70° F. (21° C.) 84+in.-lb/in² (1,500+kg-m/m²).

What is claimed is:

1. A copolyamide having a Brookfield melt viscosity of less than 100 poise at 232° C., an impact resistance of at least 180 kg-m/square meter at −18° C. and at least 890 kg-m/square meter at 21° C. and a ball and ring softening temperature of at least 110° C., comprising the copolymerization product of:
   a. 57.5 to 94.75 mole percent short chain polyamide-forming species;
   b. 5 to 30 mole percent polyamide-forming dimer acid;
   c. 0.25 to 12.5 mole percent amorphous polyamide forming oligomers having a number average molecular weight in the range of about 600 to about 10,000.

2. A copolyamide according to claim 1 wherein the short chain polyamide-forming species are present in the range of about 91.5 to about 65 mole percent.

3. A copolyamide according to claim 1 wherein the polyamide-forming dimer is present in the range of about 7.5 to about 25 mole percent.

4. A copolyamide according to claim 1 wherein the polyamide-forming oligomer is present in the range of about 1.0 to about 10 mole percent.

5. A copolyamide according to claim 1 wherein the short chain polyamide-forming species comprises sebacic acid and piperazine.

6. A copolyamide according to claim 1 wherein the short chain polyamide-forming species comprises azelaic acid and 1,6-hexanediamine.

7. A copolyamide according to claim 1 wherein the short chain polyamide-forming species comprises azelaic acid, adipic acid and piperazine.

8. A copolyamide according to claim 1 wherein the short chain polyamide-forming species comprises caprolactam.

9. A polyamide according to claim 1 wherein the short chain polyamide-forming species comprises caprolactam and piperazine.

10. A polyamide according to claim 1 wherein said polyamide further comprises a chain terminating species.

11. A polyamide according to claim 10 wherein said chain terminating species comprises stearic acid.

12. A copolyamide according to claim 1 wherein the amorphous amide-forming oligomer is a polyoxyalkylene diamine having a number average molecular weight in the range of about 900 to 5,000.

13. A copolyamide having a Brookfield melt viscosity of less than 100 poise at 232° C., an impact resistance of at least 180 kg-m/square meter at −180° C. and at least 890 kg-m/square meter at 21° C., a ball and ring softening temperature of at least 110° C. comprising:
   a. 57.5 to 94.75 mole percent short chain polyamide-forming moieties selected from the group consisting of:

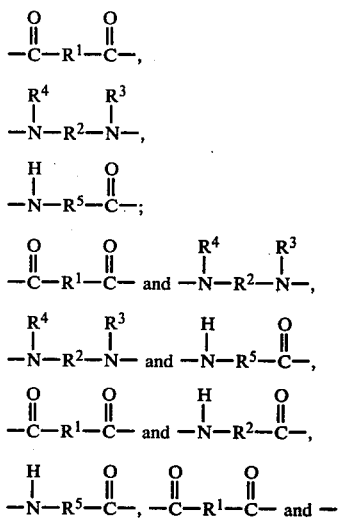

wherein $R^1$ and $R^2$ are aliphatic, cycloaliphatic or aromatic hydrocarbon radicals having from 2 to 15 carbon atoms, $R^3$ and $R^4$ are independently H or lower alkyl having from 1 to 4 carbon atoms or together form an alkylene group of 2 to 8 carbon atoms and are part of a heterocyclic ring incorporating the structure

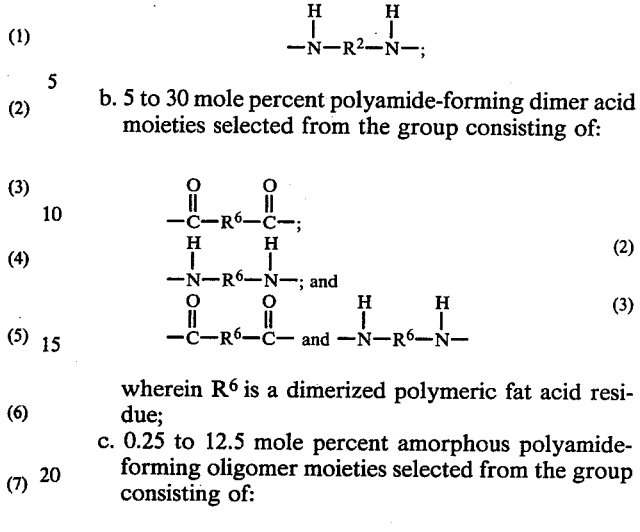

b. 5 to 30 mole percent polyamide-forming dimer acid moieties selected from the group consisting of:

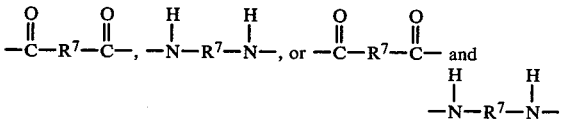

wherein $R^6$ is a dimerized polymeric fat acid residue;

c. 0.25 to 12.5 mole percent amorphous polyamide-forming oligomer moieties selected from the group consisting of:

$$-\overset{O}{\underset{\|}{C}}-R^7-\overset{O}{\underset{\|}{C}}-, \quad -\overset{H}{\underset{|}{N}}-R^7-\overset{H}{\underset{|}{N}}-, \quad \text{or} \quad -\overset{O}{\underset{\|}{C}}-R^7-\overset{O}{\underset{\|}{C}}- \text{ and}$$

$$-\overset{H}{\underset{|}{N}}-R^7-\overset{H}{\underset{|}{N}}-$$

wherein $R^7$ is a linear or branched alkyl or polyether chain having a number average molecular weight in the range of about 600 to about 10,000.

14. A copolyamide according to claim 13 wherein said hydrocarbon radicals contain heteroatoms.

* * * * *

UNITED STATES PATENT AND TRADEMARK OFFICE
CERTIFICATE OF CORRECTION

PATENT NO.   : 4,218,351
DATED        : August 19, 1980
INVENTOR(S)  : Jerald K. Rasmussen It is certified that error appears in the above—identified patent and that said Letters Patent is hereby corrected as shown below:

Column 2, line 2, replace "-180°C." with -- -18°C. -- .

Column 16, line 63, replace "-180°C." with -- -18°C. -- .

Signed and Sealed this

Twenty-seventh Day of January 1981

[SEAL]

*Attest:*

*Attesting Officer*

RENE D. TEGTMEYER

*Acting Commissioner of Patents and Trademarks*